(12) United States Patent

Hay et al.

(10) Patent No.: US 12,617,039 B2

(45) Date of Patent: May 5, 2026

(54) SCAN FIELD AND WORK PLANE EVALUATION AND ORIENTATION FOR HIGH-SPEED LASER MOTION SYSTEMS

(71) Applicant: Edison Welding Institute, Inc., Columbus, OH (US)

(72) Inventors: Jacob C. Hay, Columbus, OH (US); Ajay Krishnan, Columbus, OH (US); Ron Aman, Columbus, OH (US); Stanley L. Ream, Columbus, OH (US)

( * ) Notice: Subject to any disclaimer, the term of this patent is extended or adjusted under 35 U.S.C. 154(b) by 567 days.

(21) Appl. No.: 18/144,636

(22) Filed: May 8, 2023

(65) Prior Publication Data

US 2023/0356325 A1 Nov. 9, 2023

Related U.S. Application Data

(60) Provisional application No. 63/339,850, filed on May 9, 2022.

(51) Int. Cl.
| | |
|---|---|
| B23K 26/02 | (2014.01) |
| B23K 26/03 | (2006.01) |
| B23K 26/082 | (2014.01) |

(52) U.S. Cl.
CPC .......... B23K 26/082 (2015.10); B23K 26/032 (2013.01)

(58) Field of Classification Search
CPC .... B23K 26/02; B23K 26/082; B23K 26/032; B23K 26/06623; B23K 26/073; B23K 26/702
See application file for complete search history.

(56) References Cited

U.S. PATENT DOCUMENTS

| | | | | |
|---|---|---|---|---|
| 10,336,007 B2 * | 7/2019 | Boyer | .................. | B29C 64/153 |
| 2002/0125231 A1 * | 9/2002 | Hunter | ............... | G03F 7/70725 |
| | | | | 219/121.75 |

(Continued)

FOREIGN PATENT DOCUMENTS

| | | | | | |
|---|---|---|---|---|---|
| CN | 112829295 A | * | 5/2021 | ............. | B33Y 30/00 |
| ES | 2948448 T3 | * | 9/2023 | ............. | B33Y 50/02 |

OTHER PUBLICATIONS

International Search Report and Written Opinion of the International Searching Authority for International Patent App. No. PCT/US2023/021486 dated as mailed on Jul. 18, 2023 (8 pages).

*Primary Examiner* — Abdullahi Nur

(57) ABSTRACT

System and methods for evaluating build platform flatness and parallelism relative to a focal plane of a high-speed laser in high-speed laser motion systems, wherein the high-speed laser motion systems include the high-speed laser that generates a laser beam, and the build platform having a work plane, comprising positioning a plurality of pin-hole sensors within the focal plane of the high-speed laser, wherein each of the pin-hole sensors is positioned at a predetermined location; directing the laser beam to the predetermined locations of each pin-hole sensor; measuring a spot size of the laser beam at each pin-hole sensor, wherein the spot size at each pin-hole defining structure has a measureable diameter; comparing the measurable diameters obtained at each pin-hole sensor; and adjusting the work plane of the build platform to a position where the measurable diameters of the spot sizes are equal at each pin-hole sensor.

10 Claims, 12 Drawing Sheets

(56) References Cited

U.S. PATENT DOCUMENTS

| | | | | |
|---|---|---|---|---|
| 2003/0052105 A1* | 3/2003 | Nagano | ................ | B29C 64/153 |
| | | | | 219/121.83 |
| 2013/0075377 A1* | 3/2013 | Cheng | .................. | H01S 3/1643 |
| | | | | 219/121.85 |
| 2017/0304947 A1 | 10/2017 | Shibazaki | | |
| 2019/0301970 A1 | 10/2019 | Ream et al. | | |
| 2020/0338669 A1* | 10/2020 | Shi | ........................ | B29C 64/277 |
| 2021/0187861 A1 | 6/2021 | Zeulner et al. | | |
| 2022/0055146 A1* | 2/2022 | Gabilondo | ............ | B23K 26/34 |
| 2022/0168813 A1* | 6/2022 | Dardis | ................... | B22F 10/85 |

\* cited by examiner

SCAN FIELD AND WORK PLANE EVALUATION AND ORIENTATION FOR HIGH-SPEED LASER MOTION SYSTEMS

CROSS-REFERENCE TO RELATED APPLICATIONS

This patent application claims the benefit of U.S. Provisional Patent Application Ser. No. 63/339,850 filed on May 9, 2022 and entitled "Scan Field and Work Plane Evaluation and Orientation for High-Speed Laser Systems", the disclosure of which is hereby incorporated by reference herein in its entirety and made part of the present U.S. utility patent application for all purposes.

BACKGROUND

The disclosed technology relates in general to laser systems having high speed motion capability and more specifically to systems, devices, and methods for characterizing, analyzing, and verifying proper functioning and performance of lasers used in laser processing systems having high speed motion capability.

Laser processing typically includes using a laser beam to modify a work piece in a predetermined manner. Laser processing ranges from high-intensity laser ablation processes to significantly lower intensity processes such as heat treating, in which melting is avoided. Nearly all laser processing techniques involve forming the laser beam into a specific size and shape at a particular location or working distance from the laser system. Precise identification of the location where a laser system will create a focal spot or image having the desired characteristics is an important aspect of creating an efficient and optimized laser process.

Laser processing techniques include laser beam welding (LBW), which is a fusion welding process used to join materials in various configurations. Laser beam welding systems typically include a laser light source, a laser light delivery system, an optical arrangement for delivering laser the light to a work piece, and frequently a motion system for moving either the laser or the work piece. LBW systems may include fiber-delivered beams or open beam paths, fixed optical systems or galvanometer systems that allow for rapid deflection of the laser beam. Mechanical motion systems may include high-speed systems or low-speed systems depending on intended application. For the LBW process, laser light is focused using optical arrangements that include a collimation lens or mirror that stops the divergence of the laser light from the light source and delivers the light to a focusing lens or mirror (or other optic). The focusing lens or mirror then directs the high-intensity, focused laser light to the work piece that is to be welded. The high-intensity laser light is then used to melt the material of the work piece and fuse two or more parts or components together.

The use of laser processing systems, particularly LBW systems, in manufacturing has become common and such systems can be found in many manufacturing facilities worldwide. The functional success of all laser processing systems depends on predetermined, stable, and repeatable laser beam characteristics including focal spot shape, distribution, and location. Accordingly, there is an ongoing need for accurate, easy to use, and affordable systems, devices, and methods for analyzing the quality and dynamic accuracy of laser focal spots or images formed by laser processing systems having motion capability.

SUMMARY

The following provides a summary of certain example implementations of the disclosed technology. This summary is not an extensive overview and is not intended to identify key or critical aspects or elements of the disclosed technology or to delineate its scope. However, it is to be understood that the use of indefinite articles in the language used to describe and claim the disclosed technology is not intended in any way to limit the described technology. Rather the use of "a" or "an" should be interpreted to mean "at least one" or "one or more".

One implementation of the disclosed technology provides a method for evaluating build platform flatness and parallelism relative to a focal plane of a high-speed laser in high-speed laser motion systems, wherein the high-speed laser motion systems include the high-speed laser that generates a laser beam, and the build platform having a work plane, comprising positioning a plurality of pin-hole sensors within the focal plane of the high-speed laser, wherein each of the pin-hole sensors is positioned at a predetermined location; directing the laser beam to the predetermined locations of each pin-hole sensor; measuring a spot size of the laser beam at each pin-hole sensor, wherein the spot size at each pin-hole defining structure has a measureable diameter; comparing the measurable diameters obtained at each pin-hole sensor; and adjusting the work plane of the build platform to a position where the measurable diameters of the spot sizes are equal or substantially equal at each pin-hole sensor.

The focal plane of the high-speed laser is ideally parallel to the work plane of the build platform. The method may further comprise repeatedly redirecting the laser beam to the predetermined locations of each pin-hole sensor, re-measuring the spot size of laser beam at each pin-hole sensor, and re-adjusting the work plane of the build platform. The method may further comprise providing feedback to an operator indicating the adjustments necessary for making the work plane of the build platform parallel with the focal plane of the high-speed laser. The method may further comprise analyzing working parameters of the high-speed laser motion systems, by measuring the spot size of the laser beam at each pin-hole sensor; comparing the measured spot sizes obtained at each pin-hole sensor; calculating changes in the working parameters due to non-uniformity between the measured spot sizes; and recording the location and profile of the work plane for use during processing. The method may further comprise providing feedback to an operator indicating the adjustments necessary for making the work plane of the build platform parallel with the focal plane of the high-speed laser. The high-speed laser motion systems may be two-dimensional. The method may further comprise analyzing orientation of the high-speed laser motion systems, by measuring the spot size of the laser beam at each pin-hole sensor; comparing the measured spot sizes obtained at each pin-hole sensor; calculating necessary movement of the high-speed laser in the z-axis due to non-uniformity between the measured spot sizes; recording the location and profile of the work plane for use during processing; running a measurement cycle with z-axis compensation; and verifying uniformity in the measured spot sizes between each pin-hole sensor. The method may further comprise providing feedback to an operator indicating the adjustments necessary for making the work plane of the build platform parallel with the focal plane of the high-speed laser. The high-speed laser motion systems may be three-dimensional.

Another implementation of the disclosed technology provides a system for evaluating build platform flatness and parallelism relative to a focal plane of a high-speed laser in high-speed laser motion systems, wherein the high-speed laser motion systems include the high-speed laser that generates a laser beam, and the build platform having a work plane, comprising positioning a portable testing apparatus within the focal plane of the high-speed laser, wherein the portable testing apparatus includes a plurality of pin-hole sensors, wherein each of the pin-hole sensors is mounted at a predetermined location in the portable testing apparatus; directing the laser beam to the predetermined locations of each pin-hole sensor; measuring a spot size of the laser beam at each pin-hole sensor, wherein the spot size at each pin-hole defining structure has a measureable diameter; comparing the measurable diameters obtained at each pin-hole sensor; and adjusting the work plane of the build platform to a position where the measurable diameters of the spot sizes are equal or substantially equal at each pin-hole sensor.

The focal plane of the high-speed laser is ideally parallel to the work plane of the build platform. The system may further comprise repeatedly redirecting the laser beam to the predetermined locations of each pin-hole sensor, re-measuring the spot size of laser beam at each pin-hole sensor, and re-adjusting the work plane of the build platform. The system may further comprise providing feedback to an operator indicating the adjustments necessary for making the work plane of the build platform parallel with the focal plane of the high-speed laser. The system may further comprise analyzing working parameters of the high-speed laser motion systems, by measuring the spot size of the laser beam at each pin-hole sensor; comparing the measured spot sizes obtained at each pin-hole sensor; calculating changes in the working parameters due to non-uniformity between the measured spot sizes; and recording the location and profile of the work plane for use during processing. The system may further comprise providing feedback to an operator indicating the adjustments necessary for making the work plane of the build platform parallel with the focal plane of the high-speed laser. The high-speed laser motion systems may be two-dimensional. The system may further comprise analyzing orientation of the high-speed laser motion systems, by measuring the spot size of the laser beam at each pin-hole sensor; comparing the measured spot sizes obtained at each pin-hole sensor; calculating necessary movement of the high-speed laser in the z-axis due to non-uniformity between the measured spot sizes; recording the location and profile of the work plane for use during processing; running a measurement cycle with z-axis compensation; and verifying uniformity in the measured spot sizes between each pin-hole sensor. The system may further comprise providing feedback to an operator indicating the adjustments necessary for making the work plane of the build platform parallel with the focal plane of the high-speed laser. The high-speed laser motion systems may be three-dimensional.

It should be appreciated that all combinations of the foregoing concepts and additional concepts discussed in greater detail below (provided such concepts are not mutually inconsistent) are contemplated as being part of the technology disclosed herein and may be implemented to achieve the benefits as described herein. Additional features and aspects of the disclosed system, devices, and methods will become apparent to those of ordinary skill in the art upon reading and understanding the following detailed description of the example implementations. As will be appreciated by the skilled artisan, further implementations are possible without departing from the scope and spirit of what is disclosed herein. Accordingly, the descriptions provided herein are to be regarded as illustrative and not restrictive in nature.

4

BRIEF DESCRIPTION OF THE DRAWINGS

The accompanying drawings, which are incorporated into and form a part of the specification, schematically illustrate one or more example implementations of the disclosed technology and together with the general description given above and detailed description given below, explain the principles of the disclosed subject matter, and wherein:

FIGS. 9A-9B depict the disclosed system determining laser spot size changes based on parallelism between a work plane relative to a focus plane of a high-speed laser motion system, wherein FIG. 9A depicts the work plane parallel to the focus plane, and wherein FIG. 9B depicts the work plane nonparallel to the focus plane.

DETAILED DESCRIPTION

Figure 1:
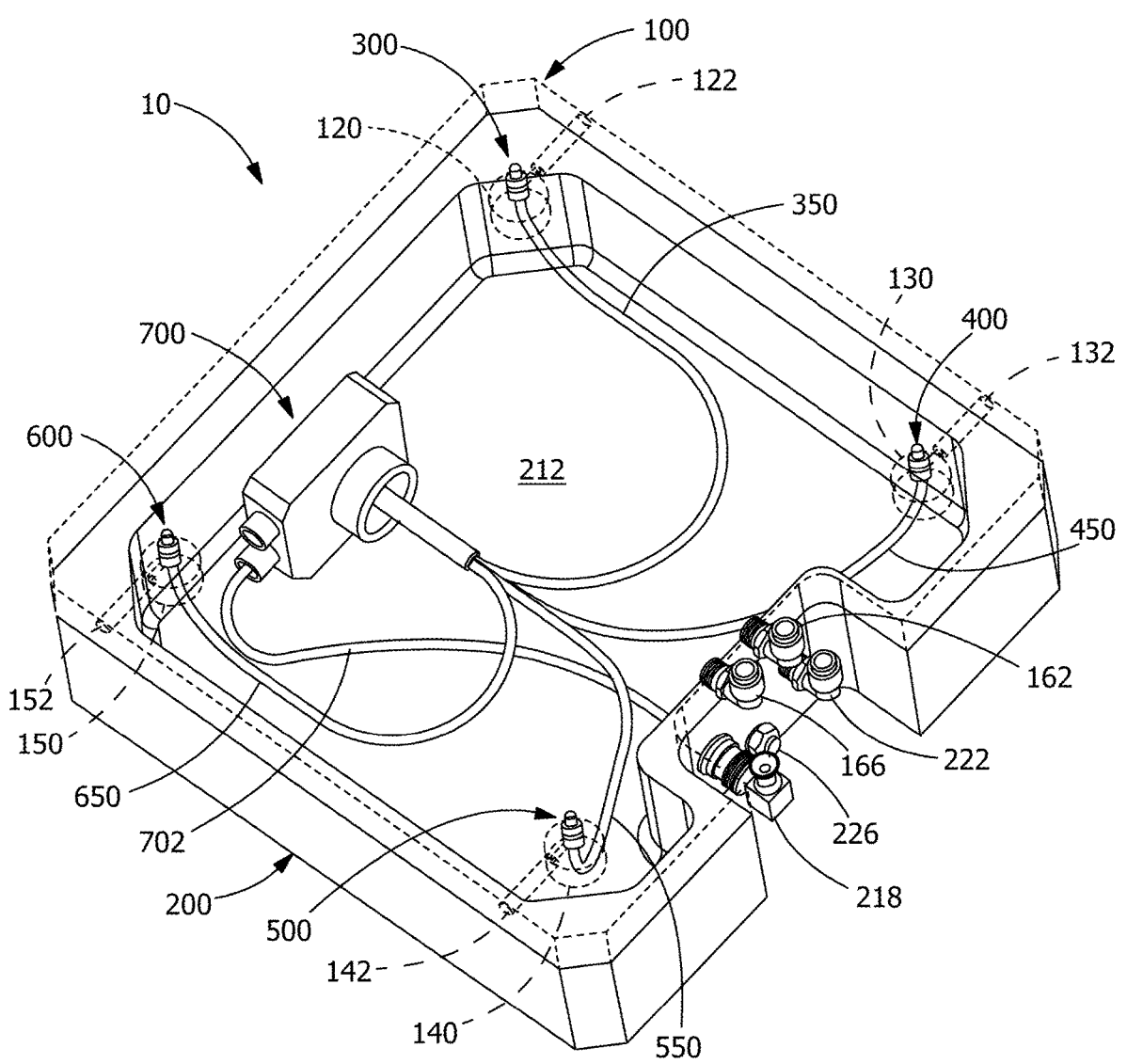
FIG. 1 is a perspective view of an example testing apparatus for use with laser powder bed fusion systems, wherein the calibration plate/support component is shown in broken lines.
Figure 2:
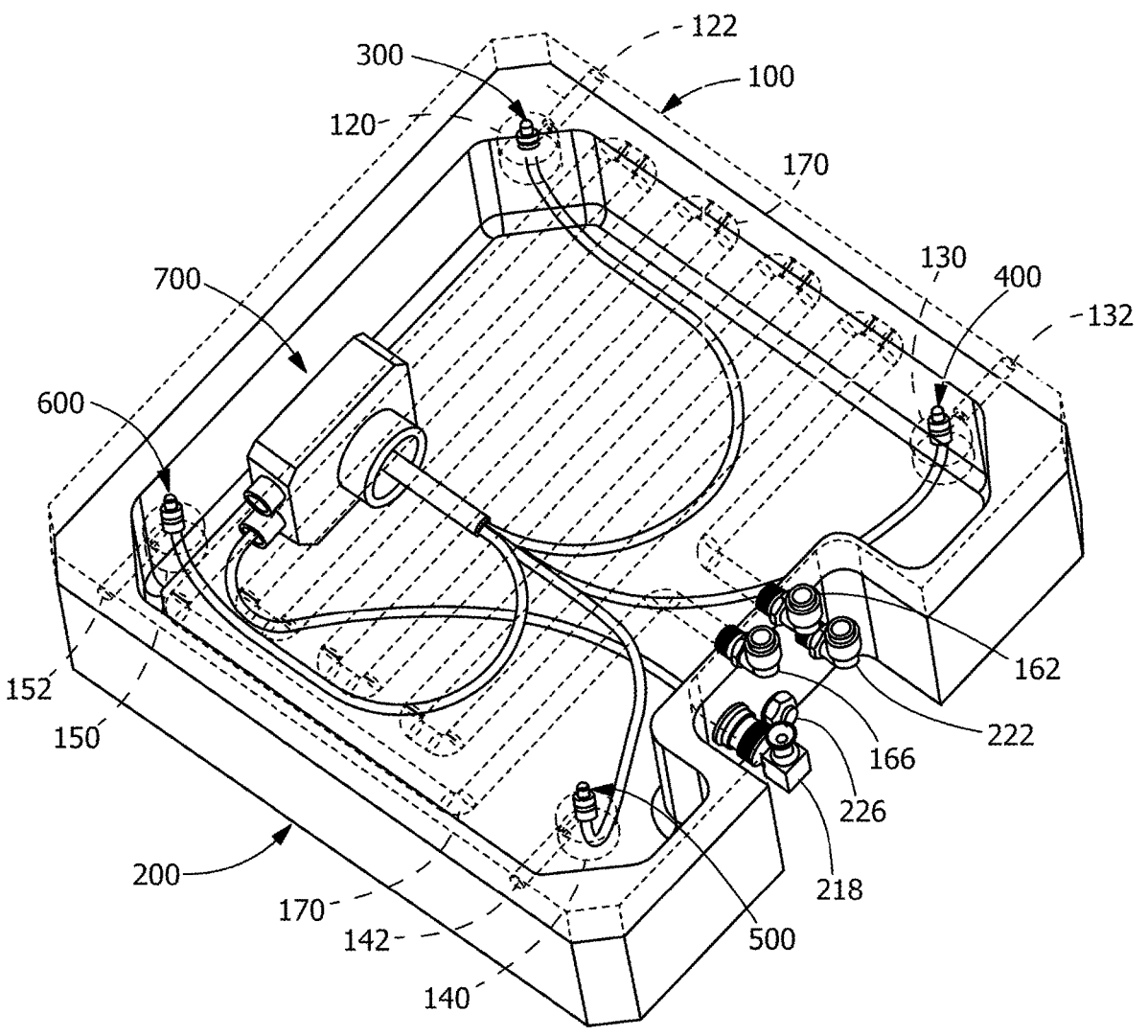
FIG. 2 is a perspective view of the testing apparatus of FIG. 1, wherein the calibration plate/support component and the cooling channels formed therein are shown in broken lines.
Figure 3:
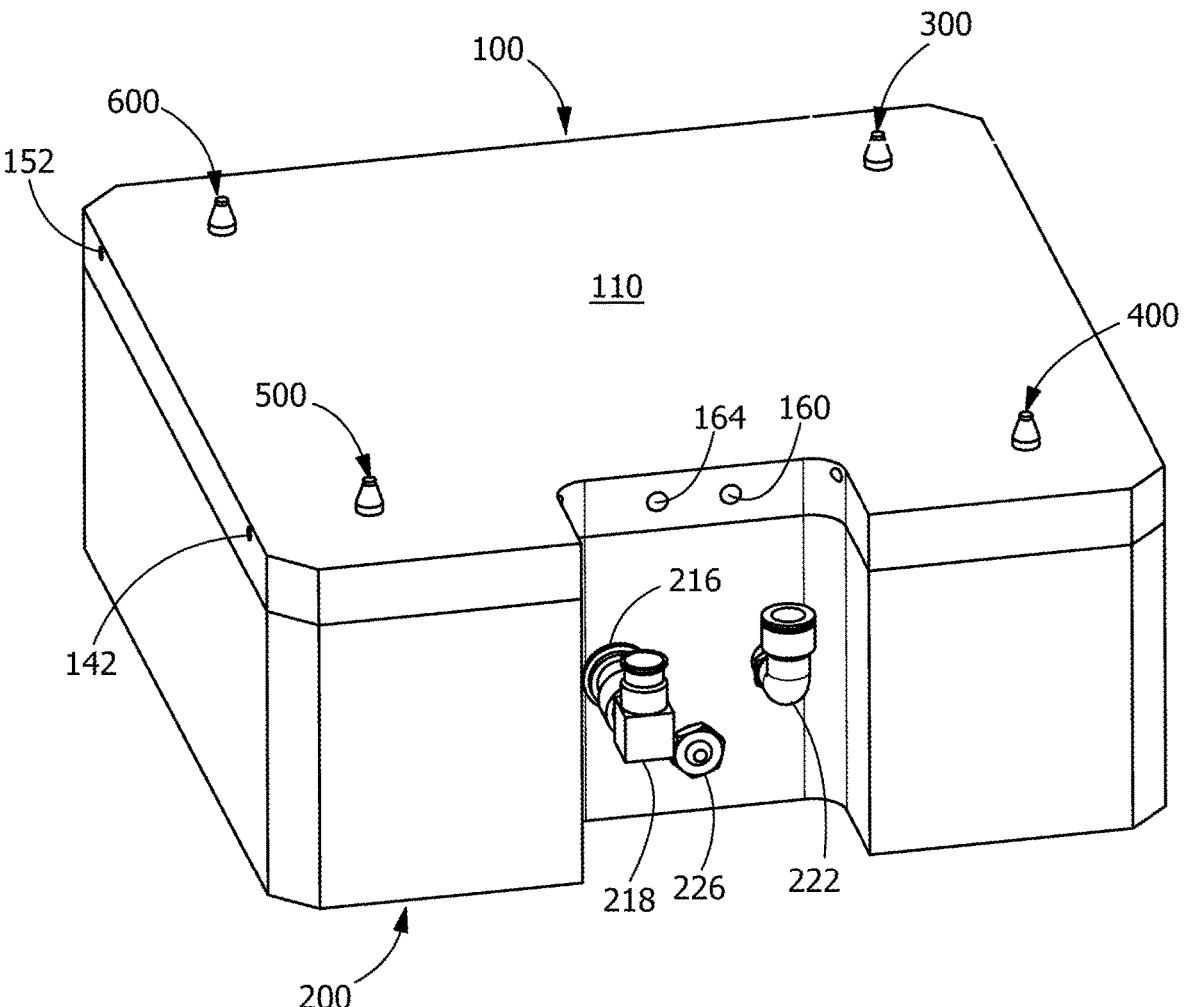
FIG. 3 is a perspective view of the testing apparatus of FIG. 1, wherein the calibration plate/support in which the pin-hole defining structures are mounted is shown in solid lines.
Figure 4:
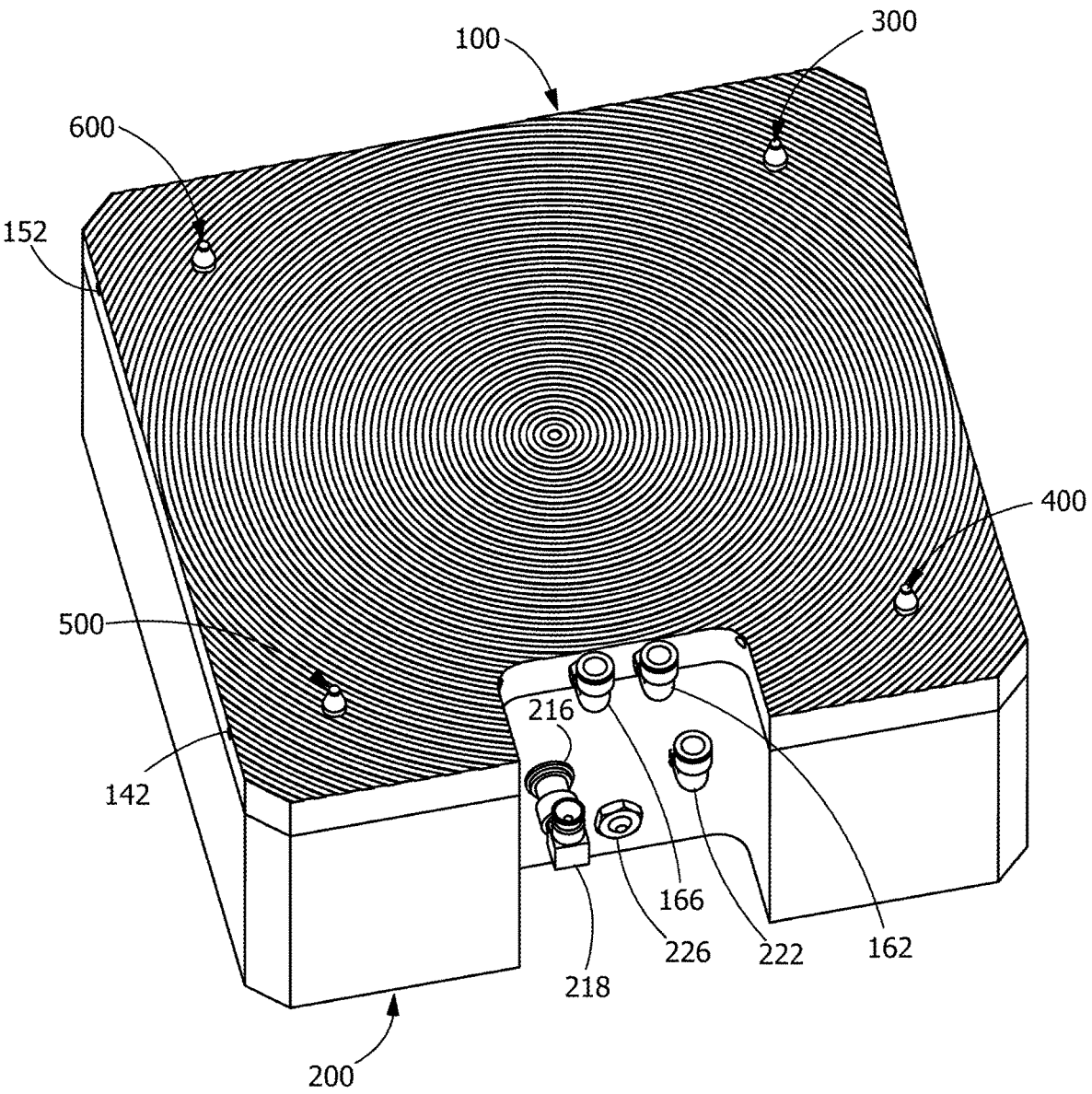
FIG. 4 is a perspective view of the testing apparatus of FIG. 1, wherein the upper surface of the calibration plate/support component includes a plurality of concentrically arranged ridges or raised portions for absorbing and distributing heat generated by a laser beam.
Figures 5A, 5B, 5C:
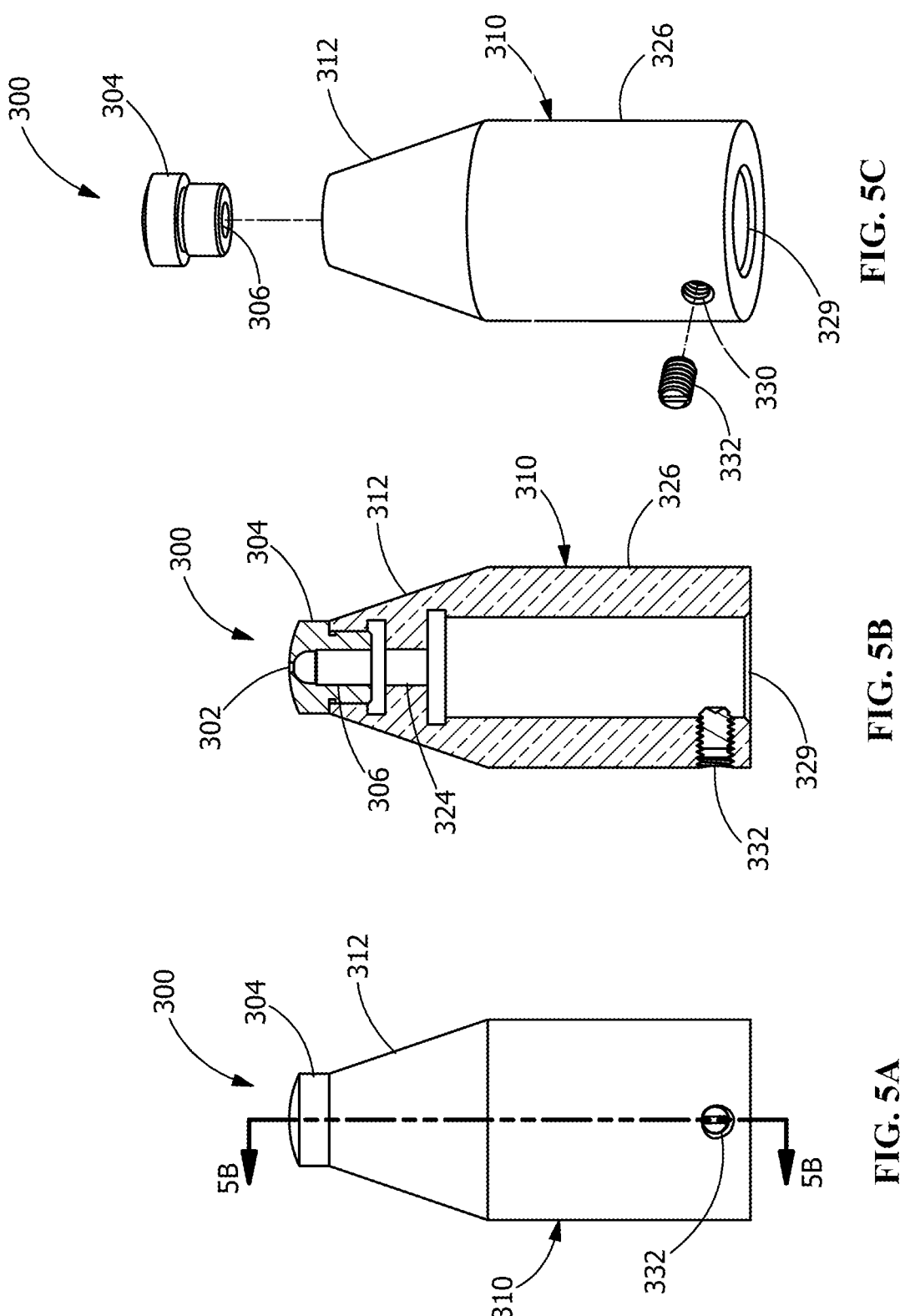
FIG. 5A is a front view of an example pin-hole defining structure (pedestal) shown in an assembled state.
FIG. 5B is a cross-sectional view of the pin-hole defining structure (pedestal) of FIG. 5A.
FIG. 5C is an exploded perspective view of the pin-hole defining structure (pedestal) of FIG. 5A.
Figure 6B:
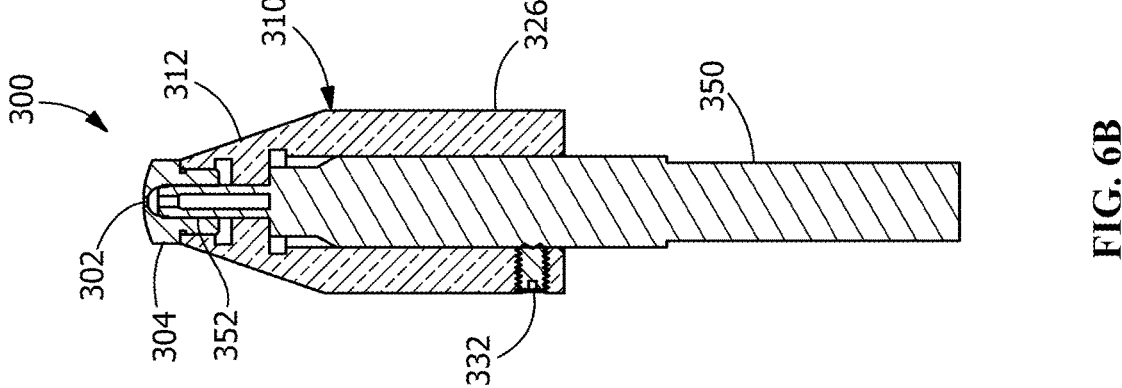
FIG. 6B is a cross-sectional view of the pin-hole defining structure (pedestal) and fiber optic cable assembly shown in FIG. 6A.
Figure 6A:
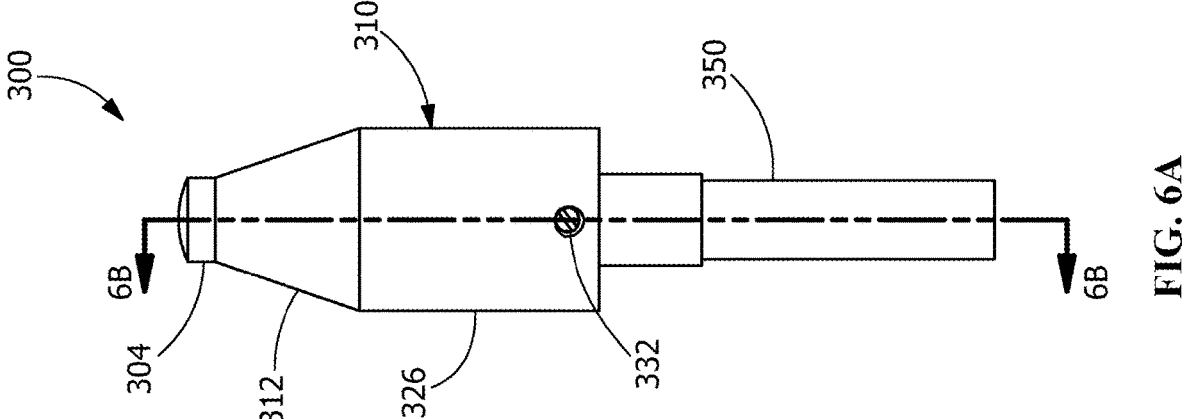
FIG. 6A is a front view of an example pin-hole defining structure (pedestal), wherein a fiber optic cable has been inserted into the pin-hole defining structure (pedestal)
Figures 7A, 7B, 7C:
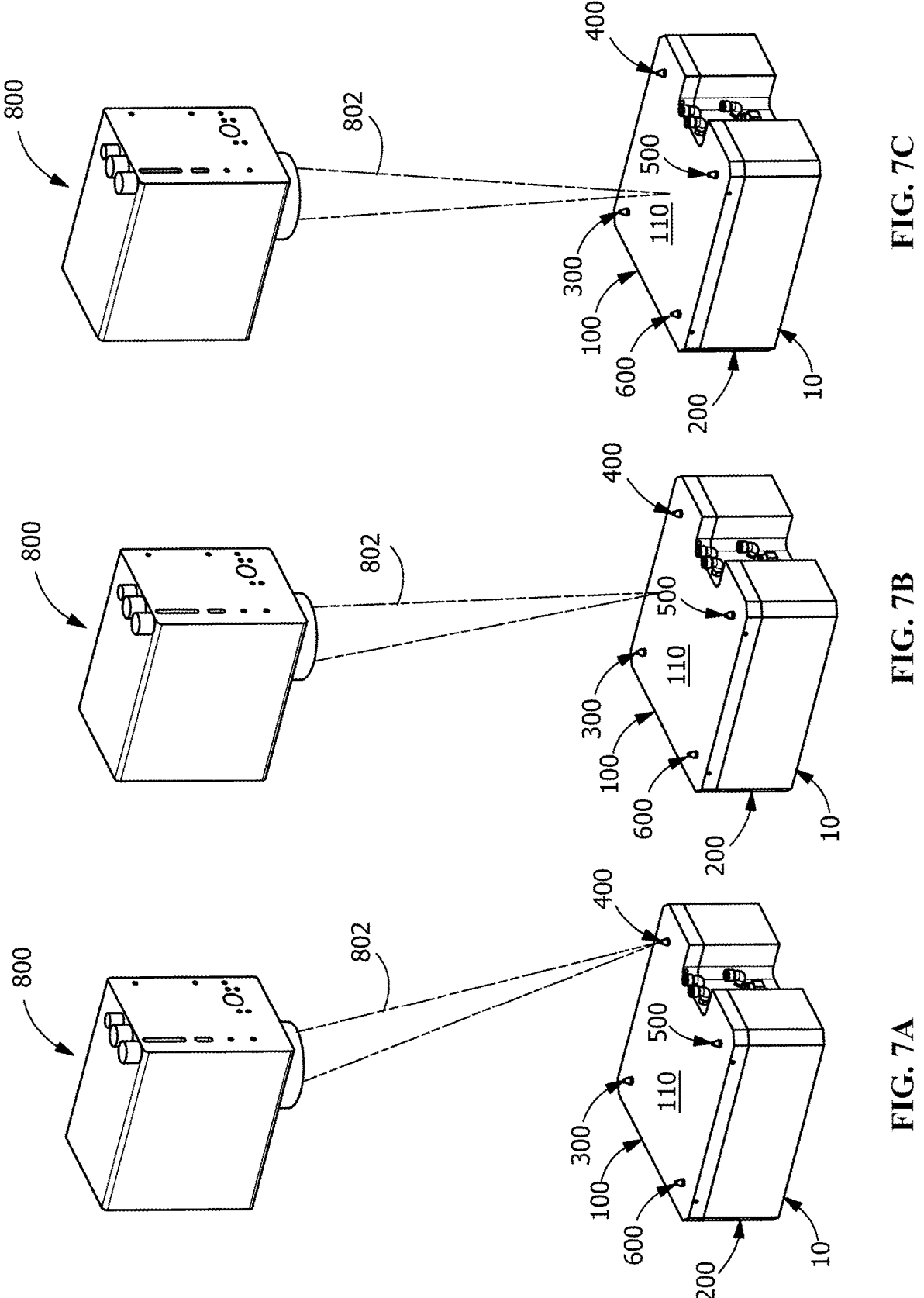
FIG. 7A is an illustration of an example testing apparatus being used to analyze the characteristics of a non-stationary laser beam being generated by a laser source present in a laser powder bed fusion system, wherein the laser beam is shown contacting the testing apparatus at a first position.
FIG. 7B is an illustration of an example testing apparatus being used to analyze the characteristics of a non-stationary laser beam being generated by a laser source present in a laser powder bed fusion system, wherein the laser beam is shown contacting the testing apparatus at a second position.
FIG. 7C is an illustration of an example testing apparatus being used to analyze the characteristics of a non-stationary laser beam being generated by a laser source present in a laser powder bed fusion system, wherein the laser beam is shown contacting the testing apparatus at a third position.
Figures 7D, 7E, 7F:
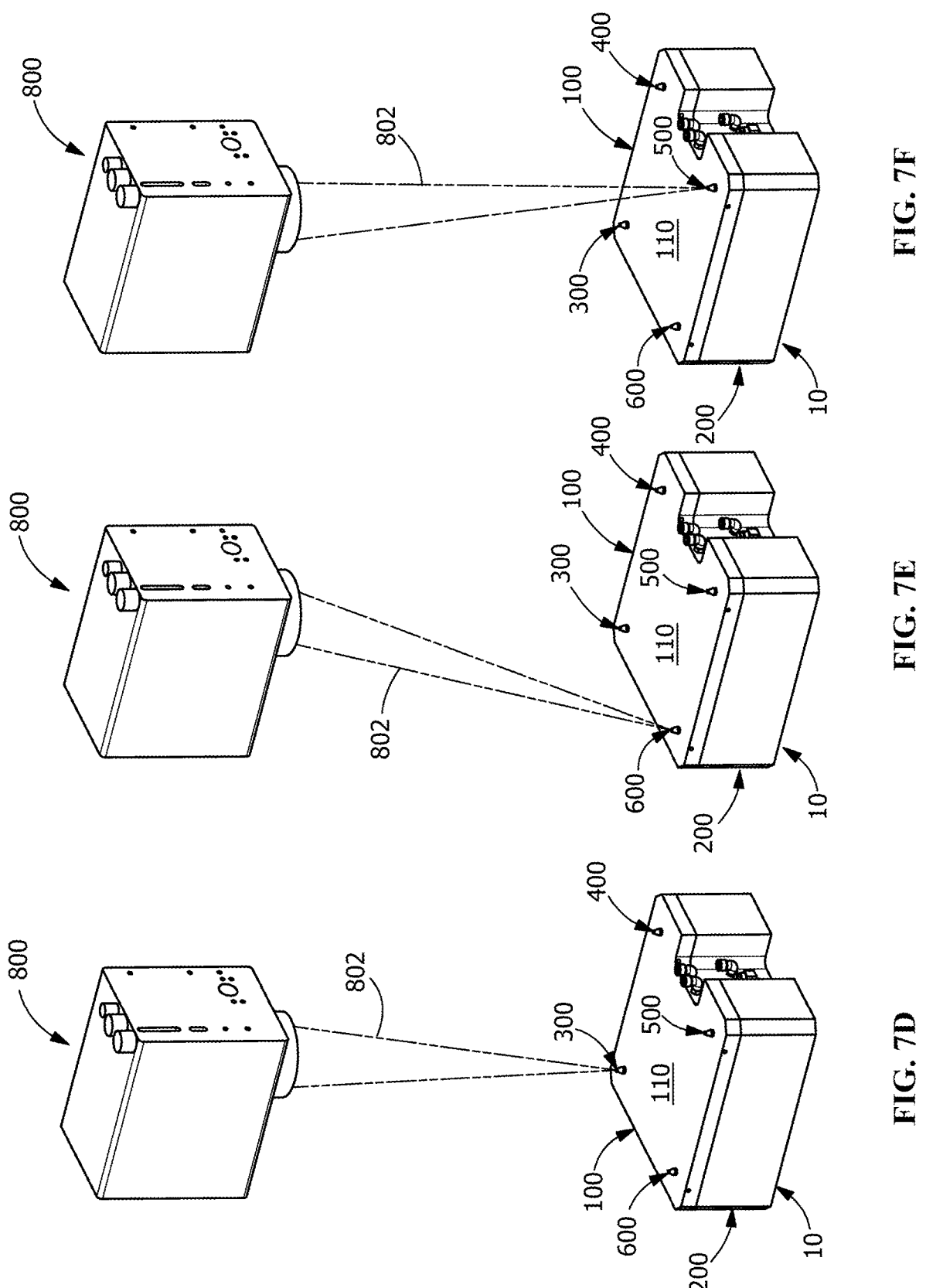
FIG. 7D is an illustration of an example testing apparatus being used to analyze the characteristics of a non-stationary laser beam being generated by a laser source present in a laser powder bed fusion system, wherein the laser beam is shown contacting the testing apparatus at a fourth position.
FIG. 7E is an illustration of an example testing apparatus being used to analyze the characteristics of a non-stationary laser beam being generated by a laser source present in a laser powder bed fusion system, wherein the laser beam is shown contacting the testing apparatus at a fifth position.
FIG. 7F is an illustration of an example testing apparatus being used to analyze the characteristics of a non-stationary laser beam being generated by a laser source present in a laser powder bed fusion system, wherein the laser beam is shown contacting the testing apparatus at a sixth position.

Example implementations are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the disclosed technology. Accordingly, the following implementations are set forth without any loss of generality to, and without imposing limitations upon, the claimed subject matter.

The examples discussed herein are examples only and are provided to assist in the explanation of the apparatuses, devices, systems, and methods described herein. None of the features or components shown in the drawings or discussed below should be taken as required for any specific implementation of any of these the apparatuses, devices, systems or methods unless specifically designated as such. For ease of reading and clarity, certain components, modules, or methods may be described solely in connection with a specific Figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

U.S. Pat. Nos. 10,976,219; and 10,627,311 are relevant to the disclosed technology and the entire contents of each of these patents is expressly incorporated by reference herein and are made part of this patent application for all purposes. These references disclose a system for use in additive manufacturing, for example, which is an industrial process that adds successive superfine layers of material to create three-dimensional objects. Each successive layer bonds or is fused to a preceding layer of melted or partially melted material and different substances for layering material, including metal powder, thermoplastics, ceramics, composites, glass, and other materials. Laser Powder Bed Fusion (L-PBF) is a specific process used in additive manufacturing wherein a three-dimensional component or part is built using a layer-by-layer approach that utilizes a high-power laser. L-PBF typically involves: (i) spreading a layer of powdered material (e.g., metal) over a build platform or plate; (ii) using a laser to fuse the first layer or first cross-section of a part; (iii) spreading a new layer of powder across the previous layer using a roller, re-coater arm, coating blade, or similar device; (iv) using the laser to fuse the new layer or new cross-section of the part; (v) adding and fusing successive layers or cross sections; (vi) repeating the process until the entire part is created. Loose, unfused powdered material remains in position, but is removed during post processing.

The functional success of L-PBF systems depends on the existence of a known and stable laser focal spot on the powder bed work plane. The technology disclosed in U.S. Pat. Nos. 10,976,219; and 10,627,311 provides a portable testing apparatus for analyzing the quality and dynamic accuracy of laser focal spots in various L-PBF systems and devices. This testing apparatus is used with a laser powder bed fusion additive manufacturing device that further includes at least one laser that generates a non-stationary laser beam having known or predetermined characteristics and a build plane positioned at a predetermined location relative to the non-stationary laser beam, wherein the non-stationary laser beam translates (i.e., traverses) across the build plane in a controlled manner during additive manufacturing processes. The apparatus includes a support having an upper surface adapted to receive and absorb laser light generated by the non-stationary laser beam; a plurality of pin-hole defining structures each positioned to receive the laser light generated by the non-stationary laser beam, and such that each pin-hole is elevated at a predetermined height above the upper surface of the support and parallel thereto; a fiber optic cable disposed within each pin-hole defining structure, wherein each fiber optic cable has a proximal end at which the laser light is received through the pin-hole and a distal end to which the laser light is delivered; and a photodetector located at the distal end of each fiber optic cable, wherein the photodetector converts the laser light delivered to the photodetector into electrical voltage output signals based on intensity of the laser light received through each pin-hole. FIGS. 1-4, 5A-C, 6A-6B, 7A-F, and 8A-C provide various illustrative views of an example testing apparatus for analyzing the quality and dynamic accuracy of laser focal spots in various laser-based manufacturing systems including L-PBF systems and laser beam welding (LBW) systems.

As best shown in FIGS. 1-4, example testing apparatus 10 includes support 100; base 200; pin-hole defining structures or pin-hole sensors 300, 400, 500, and 600, which are mounted in support 100; and photodetector 700, which is located in base 200. Support 100, which is roughly square in shape, and which may be referred to as a calibration plate, includes an absorptive upper surface 110, which may further include a series of concentrically arranged ridges or other raised structures (see FIG. 4) that absorb and distribute heat generated by the laser beam for preventing damage to upper surface 110 and support 100. Support 100 further includes first mounting recess 120 (for receiving first pin-hole defining structure 300), first set screw aperture 122 (for receiving a set screw that secures first pin-hole defining structure 300 within first mounting recess 120), second mounting recess 130 (for receiving second pin-hole defining structure 400), second set screw aperture 132 (for receiving a set screw that secures second pin-hole defining structure 400 within second mounting recess 130), third mounting recess 140 (for receiving third pin-hole defining structure 500), third set screw aperture 142 (for receiving a set screw that secures third pin-hole defining structure 500 within third mounting recess 140, fourth mounting recess 150 (for receiving fourth pin-hole defining structure 600), and fourth set screw aperture 152 (for receiving a set screw that secures fourth pin-hole defining structure 600 within fourth mounting recess 150). Support 100 also includes first aperture 160 for receiving first coolant fitting 162, second aperture 164 for receiving second coolant fitting 166 and channels 170 for receiving and transporting liquid or gas coolant that transfers energy absorbed by support 100 away from testing apparatus 10.

Also, as best shown in FIGS. 1-4, base 200, the shape of which corresponds to the shape of support 100, cooperates with support 100 to form an enclosure. Base 200 includes outer wall 210 and inner cavity 212 in which photodetector 700 and the various fiber optic cables attached to the pin-hole defining structures are placed. Base 200 also includes aperture 214 for receiving Bayonet Neill-Concelman (BNC) bulkhead 216 to which BNC connector 218 is attached, second aperture 220 for receiving gas fitting 222, and third aperture 224 for receiving gas relief valve 226. In certain embodiments, a source of pressurized gas is connected to gas fitting 222 for delivering outwardly flowing gas to and through each pin-hole for preventing the contamination thereof by debris generated during the testing process or other debris.

With reference to FIGS. 1-4, 5A-C, and 6A-6B, the example embodiment of testing apparatus 10 shown in the Figures includes four pin-hole defining structures, which are also referred to as "pedestals". FIGS. 5A-C and 6A-6B illustrate only first pin-hole defining structure 300; however, the remaining pin-hole defining structures (400, 500, and 600) are constructed in the same manner as first pin-hole defining structure 300. Accordingly, FIGS. 5A-C and 6A-6B are meant to be representative of all of the pin-hole defining structures depicted in the Figures.

As shown in FIGS. 5A-C and 6A-6B, first pin-hole defining structure or pedestal 300 includes first pin-hole 302, which is formed in tip 304 through which channel 306 passes. The diameter of pin-hole 302 is typically one third to one-thirtieth the diameter of the laser beam being characterized by testing apparatus 10 (e.g., pinhole diameter: 5-50 μm). Tip 304 typically includes a highly reflective material such as gold, copper, or other reflective metal for minimizing damage to the pin-hole and pin-hole defining structure caused by absorption of energy from the laser beam. Tip 304 is mounted within body 310 which includes tapered portion 312 and cylindrical portion 326 through which channel 328 passes. First set screw aperture 330 is adapted to receive first set screw 332 which secures first fiber optic cable 350 in body 310. First optical fiber 352 is inserted into channel 306 and brought into close proximity with first pin-hole 302. First pin-hole defining structure or pedestal 300 is mounted within support 100 such that the pin-hole is elevated above upper surface 110 at a height (e.g. 20 to 40 mm) that minimizes any damage to the pin-hole and pedestal that may be caused by the energy of the non-stationary laser beam.

FIGS. 7A-7F are illustrations of testing apparatus 10 being used to analyze the characteristics of a non-stationary laser beam generated by a laser source present in a laser powder bed fusion system being used for additive manufacturing. In these Figures, laser source or laser 800 generates laser beam 802, which contacts upper surface 110 of testing apparatus 10 at multiple positions or locations, including locations that include the previous discussed pin-holes. During the normal operation of testing apparatus 10, laser beam 802 is continually manipulated at typical operating power for bringing all the laser beam delivery elements of the laser powder bed fusion machine or system up to normal operating temperature and functionality such that any misalignment of laser beam 802 or loss of laser focus quality may be detected.

Figure 8A:
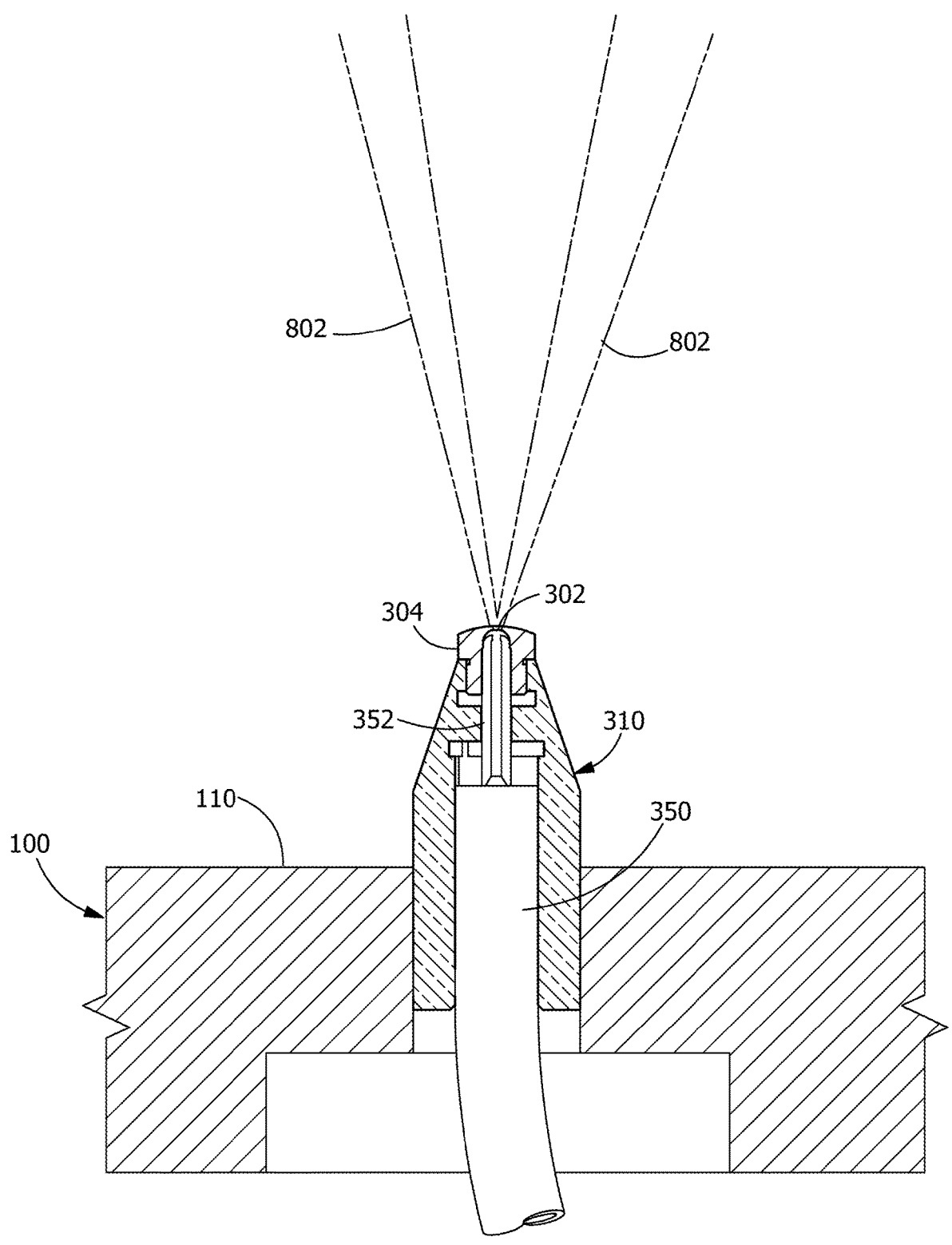
FIG. 8A is a cross-sectional view of an example pin-hole defining structure shown mounted in the calibration plate/ support and receiving laser light from a laser beam being analyzed by the testing apparatus.
Figure 8B:
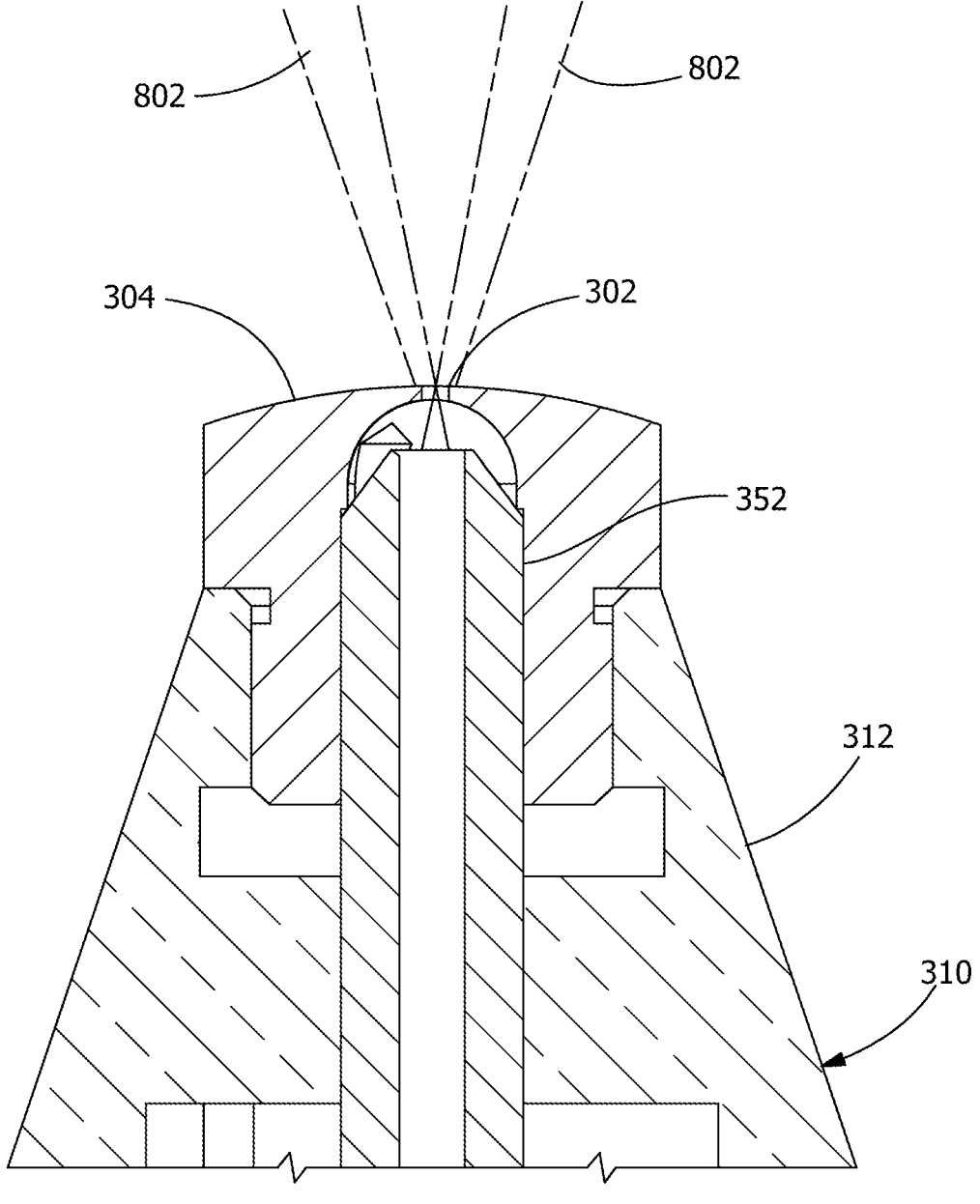
FIG. 8B is a detail of the upper portion of FIG. 8A showing a portion of the laser light passing through a pin-hole and the remaining laser light being reflected by the pin-hole defining structure.
Figure 8C:
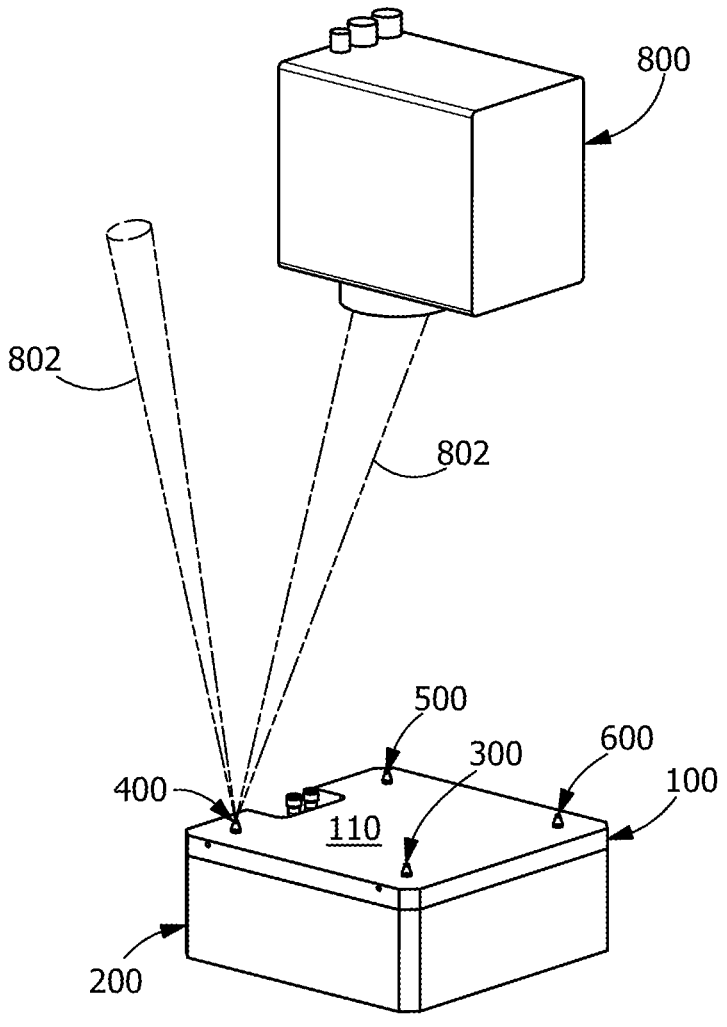
FIG. 8C is an illustration of an example testing apparatus being used to analyze the characteristics of a non-stationary laser beam being generated by a laser source present in a laser powder bed fusion system, wherein the laser beam is shown reflecting from one of the pin-hole defining structures.

FIG. 8A provides a cross-sectional view of pin-hole defining structure 300 shown mounted in support 100 and receiving laser light from laser beam 802 during normal operation of a laser powder bed fusion system being analyzed. FIG. 8B is a detail of the upper portion of FIG. 8A showing the laser light being reflected by pin-hole defining structure 300; and FIG. 8C provides an illustration of testing apparatus 10 being used to analyze the characteristics of non-stationary laser beam 802 being generated by laser source 800, wherein laser beam 802 is shown reflecting from pin-hole defining structure 400. In FIGS. 8A-8B, light from laser beam 802 is shown passing through pin-hole 302 and entering optical fiber 352 through which the signal is transmitted to photodetector 700 (see FIG. 1). The laser light than passes through pin-hole 302 is only a small amount of the laser light generated by laser beam 802. For example, for a laser beam having a total diameter of about 0.1 mm, the diameter of the portion of the beam that passes though pin-hole 302 would be about 0.025 mm. Laser light collected from each pin-hole may be transmitted to one or more light measuring devices through fiber optic coupling. Testing apparatus 10 includes a data acquisition device in communication with photodetector 700, wherein the data acquisition device receives, saves, organizes, and analyzes electrical signals as a function of time, or time and position, relative to the pin-holes through which the laser light was received. A data analysis algorithm associated with the data acquisition device calculates and determines laser beam quality based on data acquired from multiple passes of the non-stationary laser beam over the plurality of pin-holes. The data acquisition device may also include hardware and/or software (e.g., blue tooth or the like) that enables the transmission of data to a receiver located outside of an additive manufacturing device.

The systems, devices, and methods described above, and in U.S. Patent Publication No. 2021/0223140, which is also incorporated by reference herein in its entirety, are useful for analyzing many aspects of high-speed laser motion systems. In one implementation, a measuring device including at least one pinhole sensor is used to analyze scan field flatness of a high-speed laser motion system in a non-contact manner. By evaluating a laser beam and determining laser beam convergence and divergence angles (i.e., beam numerical aperture), the laser beam can be used to measure the laser spot or image sizes at various locations across the field of view of the high-speed laser motion system. Laser spot sizes are compared and evaluated to describe the location of the sensor relative to the laser focal/image plane and in turn, the location of the work plane relative to the laser focal plane. Understanding focal point location relative to the work surface (i.e., build platform) allows the system to adjust or compensate for changes in focus location, or in the case of a 3-dimensional system, move focus and compensate for these differences.

Figure 9B:
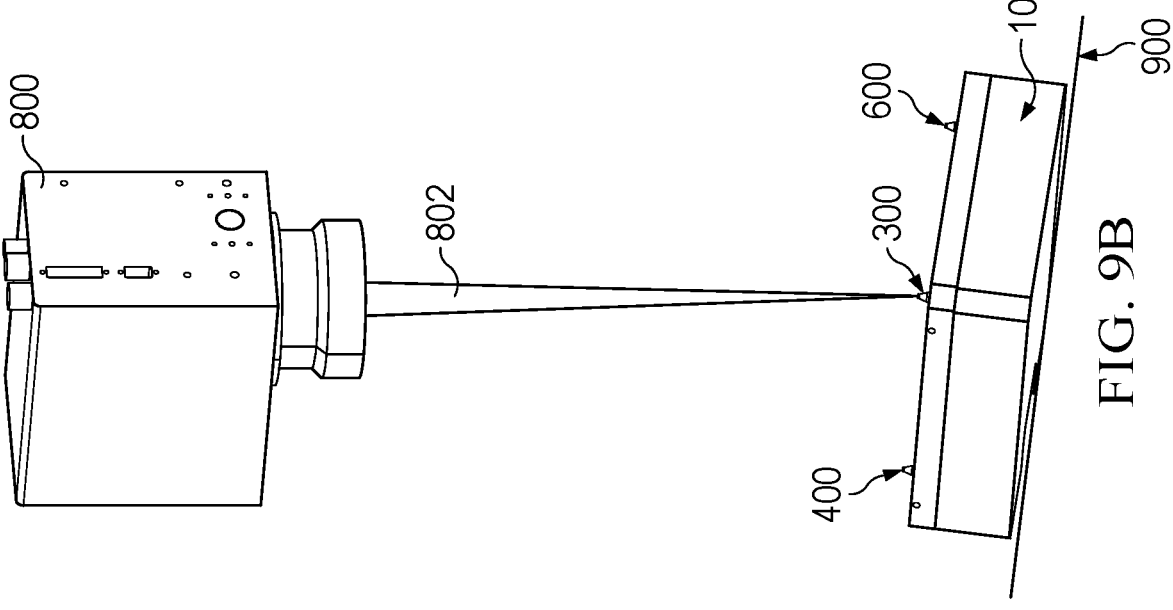
Figure 9A:
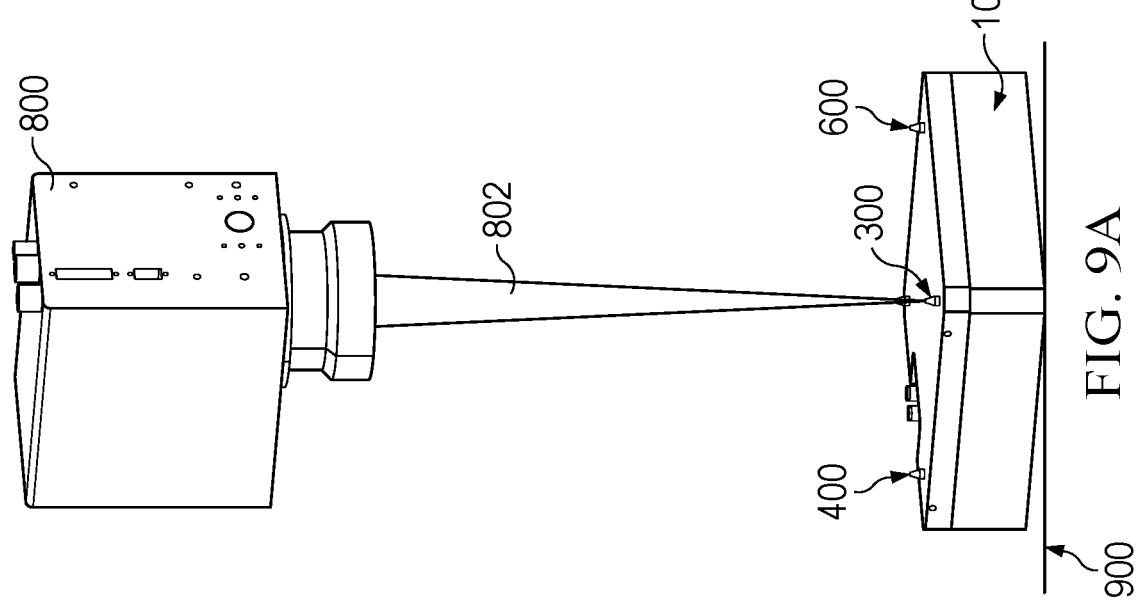

As shown in FIGS. 9A-9B, a measuring device including at least one pinhole sensor is used to analyze the flatness and parallelism of a build platform relative to a focus plane of a high-speed laser motion system by evaluating the laser beam in at least three locations, and adjusting work surface or build plate orientation until laser beam diameter is the same in all locations. Alternately, for systems with three-dimensional scanners or other three-dimensional motion systems, measurements are collected at multiple locations and the system then calculates corrections (e.g., motion offsets) necessary for a 3-dimensional motion system to maintain focus at the top surface of the work plane. Two dimensional systems can use such data as a guide for parameter changes based on locations on the work plane.

Example implementations analyze two-dimensional high-speed laser motion system orientation by: (i) taking laser spot or image size measurements at a minimum of three locations on the work plane; (ii) comparing laser spot or image size measurements; (iii) calculating necessary work plane adjustments; (iv) making adjustments to the system; and (v) repeating steps (i)-(iii). Example implementations of the disclosed technology analyze two-dimensional high-speed laser motion system parameters by: (i) taking laser spot or image size measurements at all available measurement locations on the work plane; (ii) evaluating laser spot or image sizes measured; (iii) calculating the necessary parameter changes due to spot or image size change; and (iv) recording work plane locations and profile for use during processing. The system may also provide feedback to an operator indicating adjustments necessary for making the work plane of the build platform parallel with the focal plane of the laser.

Example implementations analyze three-dimensional high-speed laser motion system orientation by: (i) taking laser spot size measurements at all available measurement locations on the work plane; (ii) evaluating laser spot or image sizes measured; (iii) calculating the necessary z-axis scanner movement; (iv) recording work plane locations and profile for use during processing; (v) running measurement cycle with z-axis compensation; and (vi) verifying spot or image size at all locations. The system may also provide feedback to an operator indicating adjustments necessary for making the work plane of the build platform parallel with the focal plane of the laser.

Key advantages and aspects of the disclosed technology include: (i) orienting the working plane using laser spot size measurements; (ii) compensating for inherent beam changes due to location within field of view; (iii) compensating with Z-axis movements; and (iv) compensating with process parameter changes. Prior art systems including Primes Scan Field Monitor and Ophir Beam Watch AM are limited in sampling capability and location (or are incapable thereof). These systems have limited or no capability to sample the beam in motion, as it would be used in-process, and these systems have no current capability to sample the beam during a build. Additionally, these systems only sample in a single location and are not capable of evaluating flatness or parallelism. Numerous business entities are original equipment manufacturers, users, customizers, and analyzers of laser processing systems, including laser powder bed fusion systems and remote laser welding systems. Commercially available analytical systems are not sufficient for analyzing laser processing systems due to design limitations that require stationary beams and because large analytical systems limit the field of view areas that can be analyzed. Additionally, industry standards such as AMS 7003 create demand for a system such as the disclosed technology, which does not suffer from the design limitations of existing systems.

FIGS. 9A-9B depict testing apparatus 10 being used to evaluate build platform flatness and parallelism relative to a focal plane of laser 800 in high-speed laser motion systems. As shown in FIG. 9A, work plane 900 is parallel with laser 800, which generates non-stationary laser beam 802 and has a predefined focal plane. Testing apparatus 10 is placed on work plane 900 within the focal plane of laser 800. Non-stationary laser beam 802 is directed to pin-hole sensors 300, 400, 500, 600 having predetermined locations, which measure spot size diameter of non-stationary laser beam 802 at each respective location. Because work plane 900 is parallel with the focal plane of laser 800, non-stationary laser beam 802 is focused at the same angle at each pin-hole sensor 300, 400, 500, 600, and the spot size diameter of non-stationary laser beam 802 is the same at each pin-hole sensor 300, 400, 500, 600. As shown in FIG. 9B, work plane 900 is nonparallel with the focal plane of laser 800. Because work plane 900 is nonparallel to the focal plane of laser 800, non-stationary laser beam 802 is focused at different angles at each pin-hole sensor 300, 400, 500, 600, causing the spot size diameter of non-stationary laser beam 802 to be different at each pin-hole sensor 300, 400, 500, 600. Accordingly, work plane 900 can be adjusted to a position in the high-speed laser motion system where the spot size diameter of non-stationary laser beam 802 is equal at each pin-hole sensor 300, 400, 500, 600 relative to the focal plane of laser 800.

All literature and similar material cited in this application, including, but not limited to, patents, patent applications, articles, books, treatises, and web pages, regardless of the format of such literature and similar materials, are expressly incorporated by reference in their entirety. Should one or more of the incorporated references and similar materials differs from or contradicts this application, including but not limited to defined terms, term usage, described techniques, or the like, this application controls.

As previously stated and as used herein, the singular forms "a," "an," and "the," refer to both the singular as well as plural, unless the context clearly indicates otherwise. The term "comprising" as used herein is synonymous with "including," "containing," or "characterized by," and is inclusive or open-ended and does not exclude additional, unrecited elements or method steps. Although many methods and materials similar or equivalent to those described herein can be used, particular suitable methods and materials are described herein. Unless context indicates otherwise, the recitations of numerical ranges by endpoints include all numbers subsumed within that range. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about", if or when used throughout this specification describe and account for small fluctuations, such as due to variations in processing. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

Underlined and/or italicized headings and subheadings are used for convenience only, do not limit the disclosed subject matter, and are not referred to in connection with the interpretation of the description of the disclosed subject matter. All structural and functional equivalents to the elements of the various implementations described throughout this disclosure that are known or later come to be known to those of ordinary skill in the art are expressly incorporated herein by reference and intended to be encompassed by the disclosed subject matter. Moreover, nothing disclosed herein is intended to be dedicated to the public regardless of whether such disclosure is explicitly recited in the above description.

There may be many alternate ways to implement the disclosed technology. Various functions and elements described herein may be partitioned differently from those shown without departing from the scope of the disclosed technology. Generic principles defined herein may be applied to other implementations. Different numbers of a given module or unit may be employed, a different type or types of a given module or unit may be employed, a given module or unit may be added, or a given module or unit may be omitted.

Regarding this disclosure, the term "a plurality of" refers to two or more than two. Unless otherwise clearly defined, orientation or positional relations indicated by terms such as "upper" and "lower" are based on the orientation or positional relations as shown in the figures, only for facilitating description of the disclosed technology and simplifying the description, rather than indicating or implying that the referred devices or elements must be in a particular orientation or constructed or operated in the particular orientation, and therefore they should not be construed as limiting the disclosed technology. The terms "connected", "mounted", "fixed", etc. should be understood in a broad sense. For example, "connected" may be a fixed connection, a detachable connection, or an integral connection; a direct connection, or an indirect connection through an intermediate medium. For an ordinary skilled in the art, the specific meaning of the above terms in the disclosed technology may be understood according to specific circumstances.

Specific details are given in the above description to provide a thorough understanding of the disclosed technology. However, it is understood that the disclosed embodiments and implementations can be practiced without these specific details. For example, circuits can be shown in block diagrams in order not to obscure the disclosed implementations in unnecessary detail. In other instances, well-known circuits, processes, algorithms, structures, and techniques can be shown without unnecessary detail in order to avoid obscuring the disclosed implementations.

Implementation of the techniques, blocks, steps and means described above can be accomplished in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

The disclosed technology can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc.

When a process corresponds to a function, its termination corresponds to a return of the function to the calling function or the main function.

Furthermore, the disclosed technology can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

It should be appreciated that all combinations of the foregoing concepts and additional concepts discussed in greater detail herein (provided such concepts are not mutually inconsistent) are contemplated as being part of the disclosed technology. In particular, all combinations of claimed subject matter appearing at the end of this disclosure are contemplated as being part of the technology disclosed herein. While the disclosed technology has been illustrated by the description of example implementations, and while the example implementations have been described in certain detail, there is no intention to restrict or in any way limit the scope of the appended claims to such detail. Additional advantages and modifications will readily appear to those skilled in the art. Therefore, the disclosed technology in its broader aspects is not limited to any of the specific details, representative devices and methods, and/or illustrative examples shown and described. Accordingly, departures may be made from such details without departing from the spirit or scope of the general inventive concept.

What is claimed:

1. A method for evaluating build platform flatness and parallelism relative to a focal plane of a high-speed laser in high-speed laser motion systems, wherein the high-speed laser motion systems include the high-speed laser that generates a laser beam, and the build platform having a work plane, comprising:

(a) positioning a plurality of pin-hole sensors within the focal plane of the high-speed laser, wherein each of the pin-hole sensors is positioned at a predetermined location;

(b) directing the laser beam to the predetermined locations of each pin-hole sensor;

(c) measuring a spot size of the laser beam at each pin-hole sensor, wherein the spot size at each pin-hole defining structure has a measurable diameter;

(d) comparing the measurable diameters obtained at each pin-hole sensor; and (e) adjusting the work plane of the build platform to a position where the measurable diameters of the spot sizes are equal at each pin-hole sensor.

2. The method of claim 1, wherein the focal plane of the high-speed laser is ideally parallel to the work plane of the build platform.

3. The method of claim 1, further comprising repeatedly redirecting the laser beam to the predetermined locations of each pin-hole sensor, re-measuring the spot size of the laser beam at each pin-hole sensor, and re-adjusting the work plane of the build platform.

4. The method of claim 1, further comprising providing feedback to an operator indicating the adjustments necessary for making the work plane of the build platform parallel with the focal plane of the high-speed laser.

5. The method of claim 1, further comprising analyzing working parameters of the high-speed laser motion systems, by:

(a) measuring the spot size of the laser beam at each pin-hole sensor;

(b) comparing the measured spot sizes obtained at each pin-hole sensor;

(c) calculating changes in the working parameters due to non-uniformity between the measured spot sizes; and (d) recording the location and profile of the work plane for use during processing.

6. The method of claim 5, further comprising providing feedback to an operator indicating the adjustments necessary for making the work plane of the build platform parallel with the focal plane of the high-speed laser.

7. The method of claim 5, wherein the high-speed laser motion systems are two-dimensional.

8. The method of claim 1, further comprising analyzing orientation of the high-speed laser motion systems, by:

(a) measuring the spot size of the laser beam at each pin-hole sensor;

(b) comparing the measured spot sizes obtained at each pin-hole sensor;

(c) calculating necessary movement of the high-speed laser in the z-axis due to non-uniformity between the measured spot sizes;

(d) recording the location and profile of the work plane for use during processing;

(e) running a measurement cycle with z-axis compensation; and (f) verifying uniformity in the measured spot sizes between each pin-hole sensor.

9. The method of claim 8, further comprising providing feedback to an operator indicating the adjustments necessary for making the work plane of the build platform parallel with the focal plane of the high-speed laser.

10. The method of claim 8, wherein the high-speed laser motion systems are three-dimensional.

* * * * *